United States Patent

Kobayashi et al.

[15] 3,675,222

[45] July 4, 1972

[54] FRAME STRUCTURE FOR MAGNETIC MEMORY PLANES

[72] Inventors: Seihin Kobayashi; Michihiro Torii; Fujio Yamakawa, all of Shizuoka-ken, Japan

[73] Assignee: Fuji Denki Kagaku Kabushiki Kaisha, Tokyo, Japan

[22] Filed: Oct. 8, 1970

[21] Appl. No.: 79,081

[30] Foreign Application Priority Data

Oct. 14, 1969 Japan....................................44/81988

[52] U.S. Cl................340/174 MA, 340/174 JA, 340/174 M, 339/17 R

[51] Int. Cl.......................................G11c 5/04, G11c 11/06

[58] Field of Search................340/174 M, 174 MA, 174 HP, 340/174 JA; 339/17 R, 17 L, 17 LC, 17 LM, 18 R, 18 B, 18 C; 248/206

[56] References Cited

OTHER PUBLICATIONS

IBM Technical Disclosure Bulletin, Vol. 9, No. 10, March 1967, pg. 1,422

*Primary Examiner*—James W. Moffitt
*Attorney*—Eliot S. Gerber

[57] ABSTRACT

An improved frame structure for a magnetic memory plane is provided, which comprises a plurality of stepped planes descending from the inner circumference of said frame toward the outer circumference thereof, a number of terminal plates being provided on the stepped planes so that the adjacent terminal plates may be disposed on the different stepped planes with a fixed space. A number of metal bars are each connected at their outer ends to the outermost terminal plates on the lowest stepped plane and, at their inner vertical portions, are projected above the uppermost stepped plane to a drive winding.

7 Claims, 8 Drawing Figures

SEIHIN KOBAYASHI
MICHIHIRO TORII
FUJIO YAMAKAWA
INVENTORS

BY Eliot S. Gerber

ATTORNEY.

SEIHIN KOBAYASHI
MICHIHIRO TORII
FUJIO YAMAKAWA
INVENTORS

BY Eliot S. Gerber
ATTORNEY.

FRAME STRUCTURE FOR MAGNETIC MEMORY PLANES

This invention relates to an improved frame structure for magnetic memory planes to be employed in information processors such as electronic computers and electronic telephone central offices.

Recently, there has been a general tendency to provide information processors capable of high-speed operation and having a high density. In regard to the memory systems, there have been attempts to use integrated circuits for their peripheral circuits and to make the memory elements smaller.

It is known that a memory system consists of a number of memory planes stacked to form a three-dimensional configuration. Each memory plane is formed of magnetic cores arranged in rows and columns and strung by X and Y drive windings and a sense winding. For example, the cores may be doughnut shaped torroids of a ferrite material.

In order to provide a small-sized memory plane of high density, it has been proposed to make the memory cores smaller and to make the spaces between the cores narrower. But, as there exists a limit in making the cores smaller, it has been proposed to narrow the spaces of adjacent terminal plates to which both ends of X and Y drive windings are soldered and, thereby, to narrow the spaces between the cores. But, when the memory plane is made smaller by narrowing the spaces between the cores and between the terminal plates provided on one surface of the frame, the soldering operations become very difficult.

To simplify the soldering operation, in the conventional magnetic core memory plane, the adjacent terminal plates and also the opposite terminal plates are alternately provided at the top and bottom surfaces of a frame of the memory plane so that both ends of each drive winding may be soldered to the top and bottom terminal plates of the frame.

But, even with that construction, it has been very troublesome to solder both ends of each drive winding to the top and bottom terminal plates of the frame. In addition, when each drive winding is soldered, as above, the outermost magnetic cores in the matrix have stress applied to them by the X and Y drive windings passing therethrough.

An object of the present invention is to provide an improved frame structure in which operations for soldering each of the drive windings to its associated terminal plates can be performed at one side of the frame without applying any stress to magnetic cores threaded by drive windings.

Another object of the present invention is to provide an improved frame structure in which spaces between adjacent terminal plates are narrowed to increase the number of cores contained in the frame or to make the frame smaller.

According to the present invention, a frame for a magnetic memory plane comprises a plurality of stepped planes descending from the inner circumference of said frame toward the outer circumference thereof, a number of terminal members provided on said stepped planes, the adjacent terminal members being disposed on the different stepped planes with a fixed space, and a number of metal bars each connected at its outer end to the outermost terminal member on the lowest plane and at its inner vertical portion projecting above the uppermost plane to a drive winding.

For a better understanding of the invention, and to show how it may be carried into effect, embodiments thereof will now be described, by way of example, with reference to the accompanying drawings, in which.

Figures 3A, 3B, 4, 7:
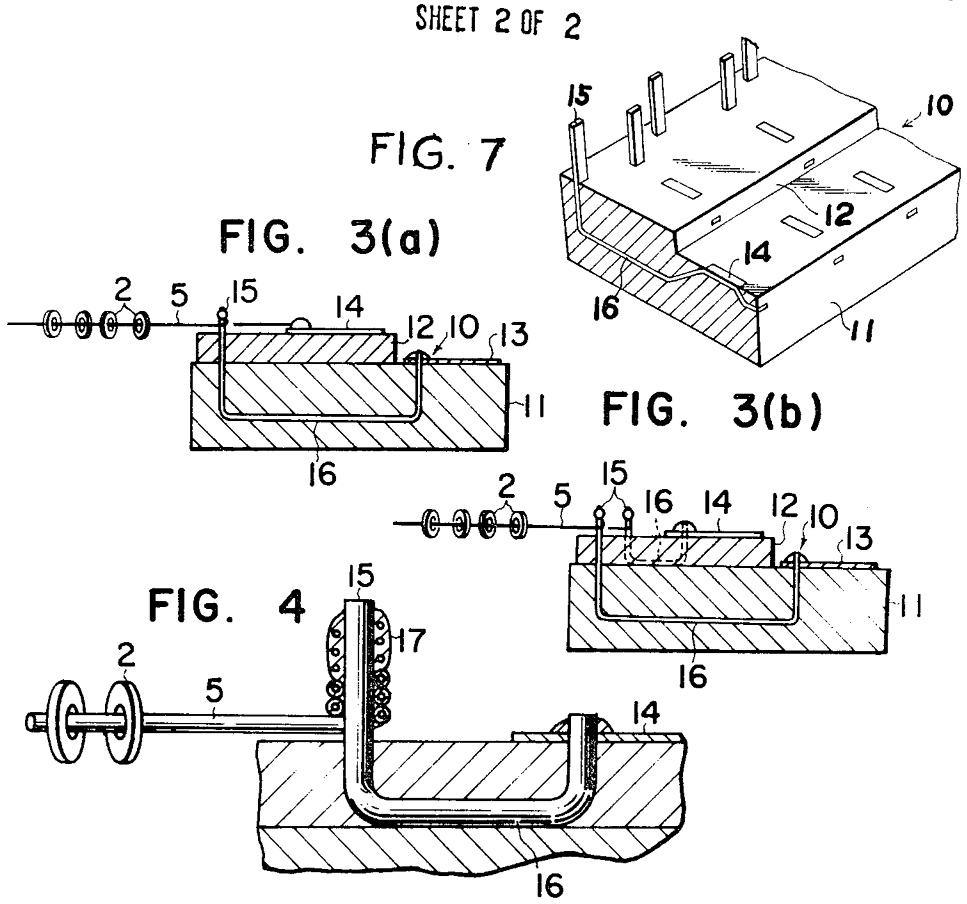
FIG. 3*a* is a partially sectioned enlarged view of a frame according to a first embodiment of the present invention.
Figure 5:
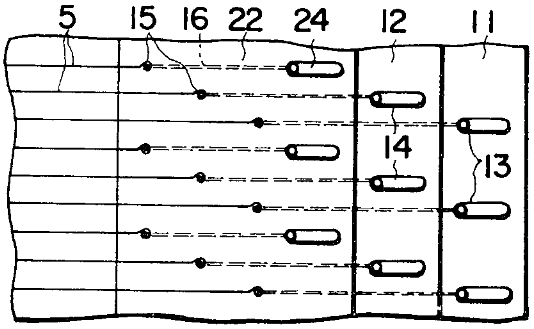
Figure 6:
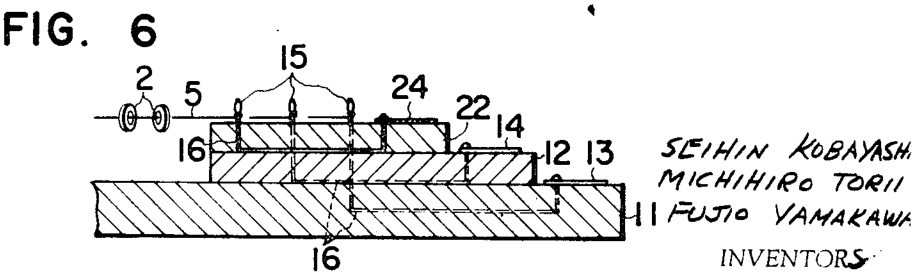

FIG. 3*b* is a partially sectioned enlarged view of a frame according to a second embodiment of the present invention;

FIG. 4 is a partially sectioned enlarged view showing a junction of an insulated winding in FIG. 3;

FIG. 5 is a partially enlarged plan view showing a frame according to a third embodiment of the present invention;

FIG. 6 is a partially sectioned enlarged view showing the same frame portion in FIG. 5; and FIG. 7 is a partially sectioned enlarged view of a frame according to a fourth embodiment of the present invention.

Figure 1:
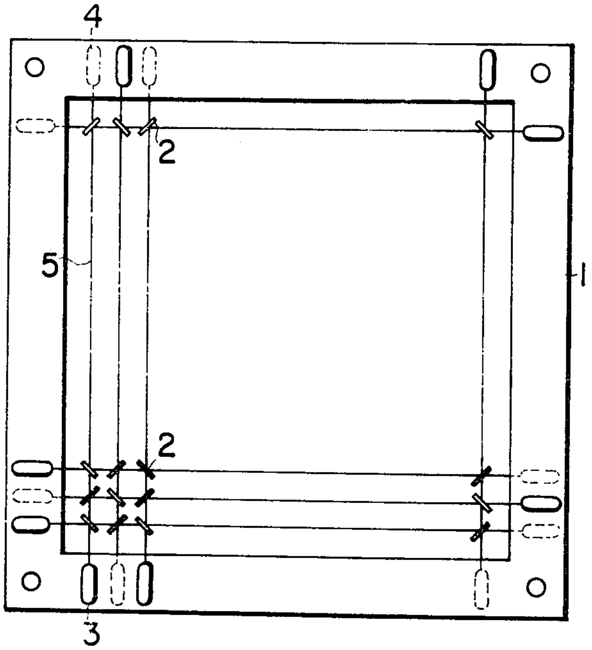
FIG. 1 PRIOR ART
FIG. 1 is a top plan view showing a conventional prior art magnetic memory plane.

In a conventional prior art magnetic core memory plane shown in FIG. 1, opposite terminal plates 3 and 4 are provided, respectively, on the top and bottom surfaces of a frame 1. Each one of the X and Y drive windings 5 are threaded through magnetic cores 2 which are arranged in a matrix and the windings are soldered at both ends to the terminal plates 3 and 4. Terminal plates adjacent to the terminal plates 3 and 4 are also provided respectively on the surfaces opposite to the terminal plates 3 and 4, namely, the bottom and top surfaces of the frame 1, thereby narrowing spaces between the adjacent terminal plates and increasing the number of cores contained in the same frame.

But, in such a conventional structure, many disadvantages have been experienced, including: (a) the magnetic cores at the circumference of the matrix are under undesirable stress because of the drive windings connected at both their ends to the top and bottom surfaces of the frame, respectively, and (b) the operations for connecting or soldering the drive windings to their associated terminal plates have to be performed at the top and bottom of the frame. Especially, when the magnetic cores are small in size, stresses have a deleterious effect on the signal-to-noise ratio.

Furthermore, as a very fine insulated film wire is used for the winding 5 and it is soldered to the terminals 3 and 4 after dissolving the insulative film (such as polyvinyl-formal and polyurethane) by a parting agent, the mechanical strength tends to be lowered (for example, the tensile strength of about 60g of a wire 0.0005 $\phi$ is lowered to about half of its normal strength), causing a problem of reliability.

On the other hand, it has been proposed to produce a frame of a magnetic memory plane having high density and high reliability by multilayers comprising a plurality of holes therethrough; but, due to technical restrictions and technical difficulties requiring that the holes be larger than one-third of the thickness of the layer, such a structure does not hold much promise.

Figure 2:
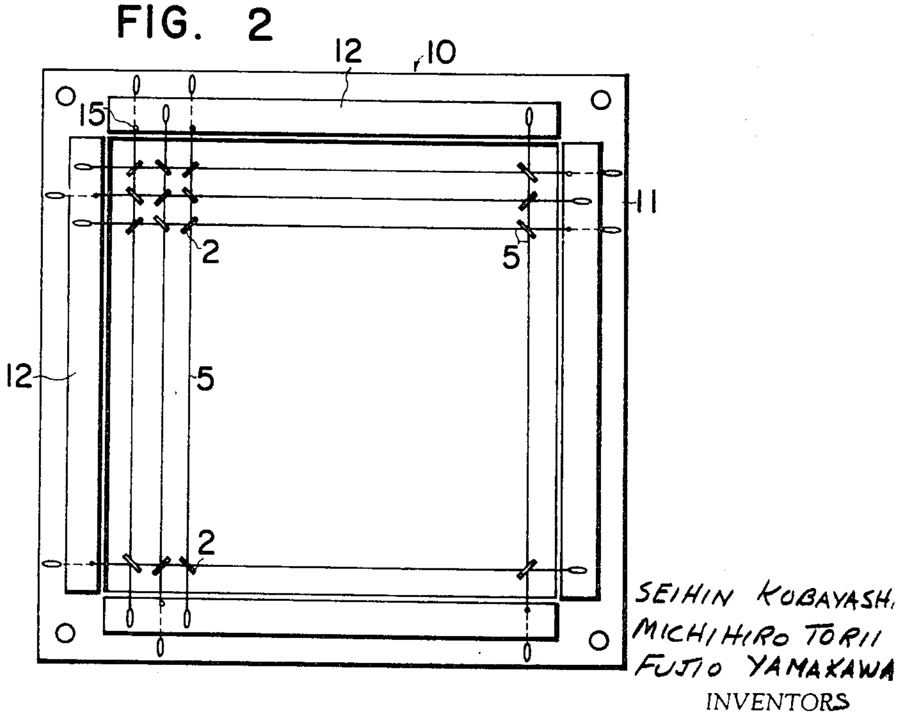
FIG. 2 is a top plan view showing a magnetic memory plane having an improved frame according to the present invention.

According to a first embodiment of the present invention shown in FIGS. 2 and 3*a*, 3*b*, a frame 10 comprises a frame body 11 and a plurality of supplemental plates 12 superimposed upon the inner circumferential portions of the frame body 11 to form two stepped planes descending toward the outer circumference of the frame body 11. A plurality of terminal plates 13 and 14 are disposed on the top surfaces of the two stepped planes, respectively, so that the adjacent terminal plates 13 and 14 are alternately on the lower plane and the upper plane and so that the opposite terminal plates may be on the different planes. These terminal plates 13 and 14 may be mounted on the frame body 11 and the supplemental plate 12 by utilizing the printed wire technique or may be formed by embedding metal plates therein.

Reference numeral 16 designates a substantially U-shaped metal bar connected at its outer end to the terminal plate 13 on the frame body 11. The inner vertical portion 15 of the metal bar 16 projects above the top surface of the supplemental plate 12, at its inner circumference, to connect the drive winding 5 to the terminal plate 13. In the first embodiment shown in FIG. 3*a*, the terminal plate 14 on the supplemental plate 12 is directly connected to the adjacent drive winding 5 by soldering.

In the second embodiment shown in FIG. 3*b*, another U-shaped metal bar 16 is provided within the supplemental plate 12 to connect, at its outer end, to the terminal plate 14 on the supplemental plate 12. The inner vertical portion of this metal bar is projected above the top surface of the supplemental plate 12 but is located at the back of the metal bar 16, connected to the terminal plate 13, so that the vertical portions 15 of the both adjacent metal bars may be shifted laterally from each other. Except for the above-mentioned respects, the other structures of the second embodiment are the same as those of the first embodiment.

The metal bars 15 may be provided within the frame body 11 and the supplemental plate 12 by inserting them through holes made beforehand therein or by embedding therein. Although the horizontal portion of the metal bar 16 is within the frame body 11 (as shown in FIGS. 3*a* and 3*b*) the lower portion of the frame body 11, below the horizontal portion of the metal bar, has been integrally adhered to the upper portion thereof after inserting the metal bar 16. Generally, the thickness of the metal bar 16 is about 0.3mm and the length projecting above the supplemental plate is about 3 to 5mm.

As is apparent from FIG. 4, showing the means of joining the drive winding of insulated film wire to the vertical portion 15 of the metal bar 16, the insulated film wire 5 is wrapped around the vertical portion 15 of the metal bar 16 toward the top several times without removing the insulated film. When a soldering iron is attached to the top of the vertical portion 15, substantially the upper half of the wrapped insulative film is melted by its heat and soldered to the vertical portion 15 by a soldering layer 17.

In a third embodiment shown in FIGS. 5 and 6, the frame 10 is formed of three stepped planes. Namely, another supplemental plate 22 is superimposed upon the supplemental plate 12 mentioned in the first and second embodiments. A number of terminal plates 24 are provided upon the top supplemental plate 22 with a fixed space permitting the two adjacent drive windings to pass therethrough. Except for the above-named respects, the other structures of the third embodiment are the same as the first embodiment.

In a fourth embodiment shown in FIG. 7, a frame 10 comprising two stepped planes is integrally formed by molding. Each metal bar 16 having an integral inner vertical portion 15 is also integrally formed together with its associated terminal plate 14.

Referring now to the process for the production of such frame structures, a group of the metal bars 16 having terminal plates 14 are provided on one plane of the frame 10. They are formed integrally from a metal sheet in which two narrow metal plates integrally connect the top ends of the vertical portion of the metal bars and the rear ends of the terminal plates, respectively. Another group of the metal bars 16 with terminal plates 14 are provided on the other plane of the frame and are also formed from a metal sheet as mentioned above. These two groups of the metal bars are set into molds so that each group of the metal bars may be shifted laterally from the other group thereof. In molding, the insulative frame 10 and the two groups of the metal bars 16 are integrally formed. The narrow metal plates connected to the top of the vertical portion 15 of each group of the bars 16 and to the rear end of the terminal plates of each group thereof are cut off, thus providing the frame structure shown in FIG. 7. According to this process, the frame structure of the present invention is provided very easily.

According to the frame structure of the present invention, as a number of terminal plates to be connected to the drive windings 5 are provided on a plurality of stepped planes at the circumference of the frame so that the adjacent terminal plates may be on the different stepped planes with a fixed space, the spaces between the drive windings can be narrowed, to a permissible degree, by narrowing the terminal plates on each plane. Therefore, the number of cores contained in the same frame can be increased, or the frame containing the same number of cores can be smaller. In addition, as the metal bars 16 are connected at their outer ends to at least the outermost terminal plates and project at their vertical portions about the innermost plane, the drive windings threaded through the magnetic cores are directly connected to the vertical portions of the metal bar and to the terminal plates on the innermost plane. Therefore, all the drive windings are kept in the same plane, thereby not applying any stress to the magnetic cores located at the circumference of the matrix.

Furthermore, as the junction of the drive winding to the vertical portion of the metal bar is composed of a lower portion (in which the drive winding is wrapped around the vertical portion without removing the insulative film) and an upper soldered portion (in which the insulative film at the upper half of the drive winding is removed as heated by soldering) the junction can be effected by desirable tension of the drive windings without lowering the mechanical strength thereof. As the soldering iron can be operated substantially vertically at the top of the vertical portion of the metal bar, adverse effects to the adjacent drive windings due to soldering heat can be completely eliminated even when the spaces between the drive windings are narrowed.

Furthermore, as the terminal plates are provided on the stepped planes descending from the inner circumference of the frame toward the outer circumference thereof so that the adjacent terminal plates may be on the different stepped planes with a fixed space, the soldering operation (to electrically connect the terminal plates to associated circuits by wires, such as tape cables and flat leads) can be easily and accurately performed at one side of the frame.

Thus, because the soldering operations can be performed at one side of the frame, not only is the soldering operation itself easy, but also subsequent care is easily effected.

We claim:

1. A frame for a magnetic memory plane, said frame comprising a plurality of stepped planes descending from the inner circumference of said frame toward the outer circumference thereof, a number of terminal members provided on said stepped planes, the adjacent terminal members being disposed on the different stepped planes with a predetermined spacing, and a number of metal bars each connected at its outer end to the outermost terminal member on the lowest stepped plane and each bar having its inner vertical portion projecting above the uppermost plane and connected to a drive winding, each of said terminal members on the uppermost plane being connected to an associated drive winding which is substantially on the same horizontal plane as those drive windings connected to said inner vertical portions of said metal bars.

2. A frame for a magnetic memory plane as claimed in claim 1, and further comprising a number of metal bars each connected at its outer end to the inner terminal member on the upper plane and at its inner vertical portion projecting above the uppermost plane to a drive winding, each of said metal bars associated with the inner terminal members being shifted laterally from said metal bars associated with the outermost terminal member.

3. A frame for a magnetic memory plane as claimed in claim 1, wherein opposite terminal members for each drive winding are provided on the different stepped planes.

4. A frame for a magnetic memory plane as claimed in claim 1, wherein said plurality of stepped planes are formed of a plurality of supplemental plates superimposed upon a frame body.

5. A frame for a magnetic memory plane as claimed in claim 1, wherein said drive winding is wrapped about the upper portion of said vertical portion of said metal bar and is soldered thereto at its upper wrapped portion.

6. A frame for a magnetic memory plane as claimed in claim 1, wherein said plurality of stepped planes are formed integrally.

7. A frame for a magnetic memory plane as claimed in claim 1, wherein each of said metal bars is integrally formed together with its associated terminal member.

* * * * *